United States Patent [19]

Vroombout

[11] 4,058,734

[45] Nov. 15, 1977

[54] PASSIVE INFRARED RESOLUTION TARGET

[75] Inventor: Leo O. Vroombout, Greene County, Ohio

[73] Assignee: The United States of America as represented by the Secretary of the Air Force, Washington, D.C.

[21] Appl. No.: 706,317

[22] Filed: July 19, 1976

[51] Int. Cl.² ............................................. G01J 1/00
[52] U.S. Cl. .................................. 250/495; 250/493; 73/1 F; 73/355 R
[58] Field of Search ....................... 250/252, 493, 495; 73/1 F, 355 R

[56] References Cited

U.S. PATENT DOCUMENTS

| 3,597,618 | 8/1971 | Jordan et al. | 250/495 |
| 3,986,384 | 10/1976 | Giorgi | 250/252 X |

Primary Examiner—Archie R. Borchelt
Attorney, Agent, or Firm—Joseph E. Rusz; Richard J. Killoren

[57] ABSTRACT

A passive target array, for measuring the resolution of infrared reconnaissance sets, having a heat retaining background pad. A plurality of perforated aluminum strips are laid on the pad in a conventional photographic resolution target configuration.

3 Claims, 6 Drawing Figures

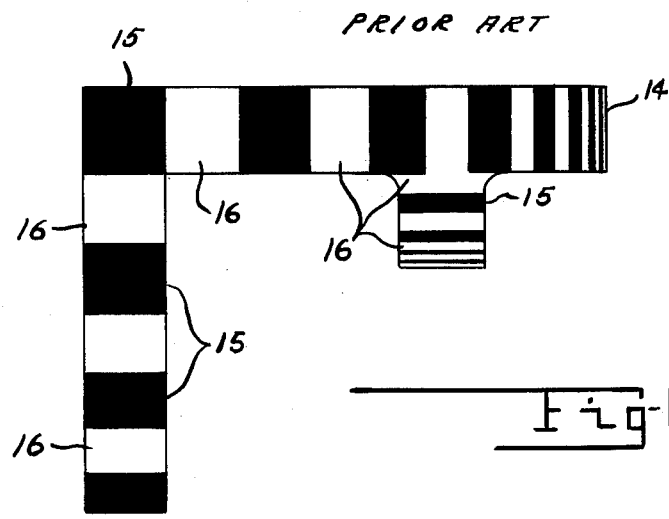
Fig-2 PRIOR ART
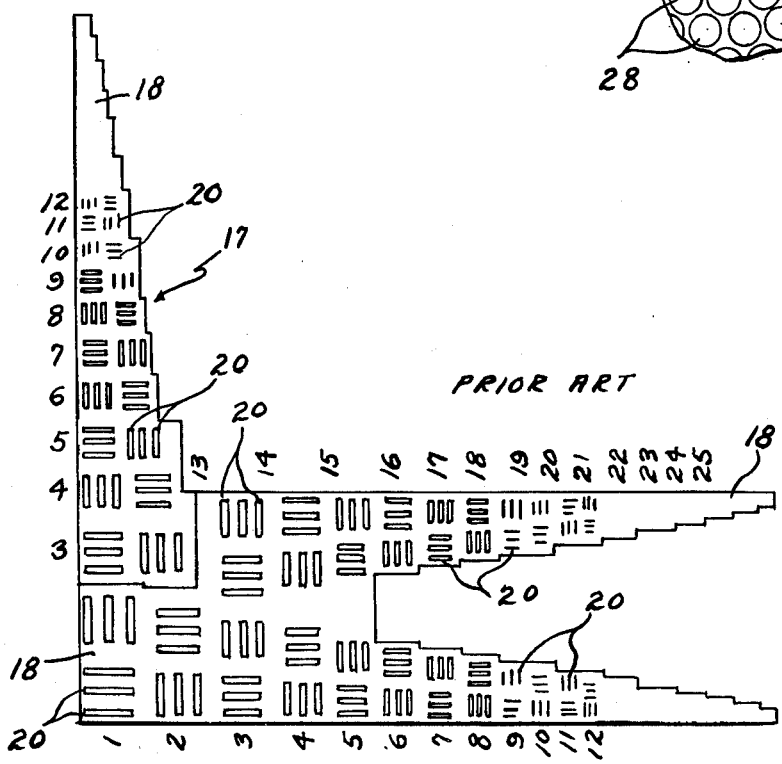
Fig-3 PRIOR ART
Fig-6

PASSIVE INFRARED RESOLUTION TARGET

RIGHTS OF THE GOVERNMENT

The invention described herein may be manufactured and used by or for the Government of the United States for all governmental purposes without the payment of any royalty.

BACKGROUND OF THE INVENTION

This invention relates to an infrared sensors performance measurement system. In the measurement of the performance of infrared sensors, various target systems have been used. The patent to Blau et al. U.S. Pat. No. 3,227,879, and Moser, U.S. Pat. No. 3,478,211, relate to systems for measuring thermal sensitivity of infrared sensors. Systems for measuring the resolution of thermal sensors have consisted of a line of uniform sized electrically heated squares positioned at different spacings along the line; rectangular shaped black and white painted areas with different absorption and infrared radiation characteristics and painted white bars on painted black or gray surface. These systems were either very expensive and difficult to use or did not provide sufficient contrast for night time use.

Some infrared systems have aluminum bars laid out on a gravel background in patterns similar to those described above. In these systems, both the bars and background were cold with respect to the scene. This often provided too much contrast with respect to the total scene and saturated the sensors.

BRIEF SUMMARY OF THE INVENTION

According to this invention, an infrared measurement system is provided for determining the resolution of infrared sensors wherein perforated aluminum panels are positioned in a conventional target array for determining photographic resolution. The aluminum panels were placed on a high heat retaining medium. One such material is a layer of polyvinyl acetate and a water emulsion sprayed over a fiberglass mat.

IN THE DRAWINGS

FIG. 2 shows a prior art infrared resolution array using passive elements.

FIG. 3 shows another prior art infrared resolution array using passive elements.

FIG. 6 is an enlarged cut away top view showing a portion of one of the panels according to this invention used in the array of FIG. 4.

DETAILED DESCRIPTION OF THE INVENTION

Figure 1:
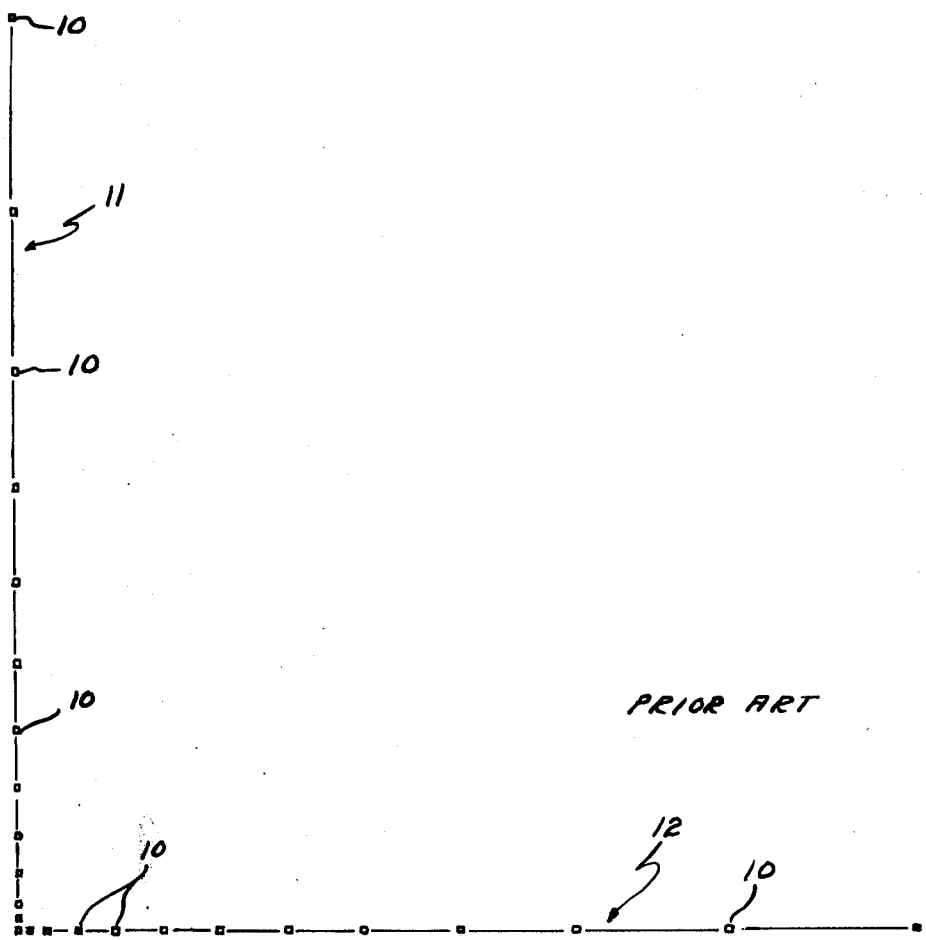
FIG. 1 shows a prior art infrared resolution array using heated elements.

Reference is now made to FIG. 1 of the drawing which shows a prior art infrared resolution target using heated elements 10 spaced at different distances along lines 11 and 12. The elements 10 are always warmer than the background. This array is useful for night time testing, provided that electrical power is available. The standard deviation of measurements using this target is much greater than from a three-bar array.

The prior art infrared resolution array 14, shown in FIG. 2, has black and white painted blocks 15 and 16. The prior art infrared resolution array 17, shown in FIG. 3, has a background 18 painted black with elements 20 painted over the black with aluminum paint. These arrays are passive arrays useful during sunlight conditions. At night these arrays lose contrast.

Figure 4:
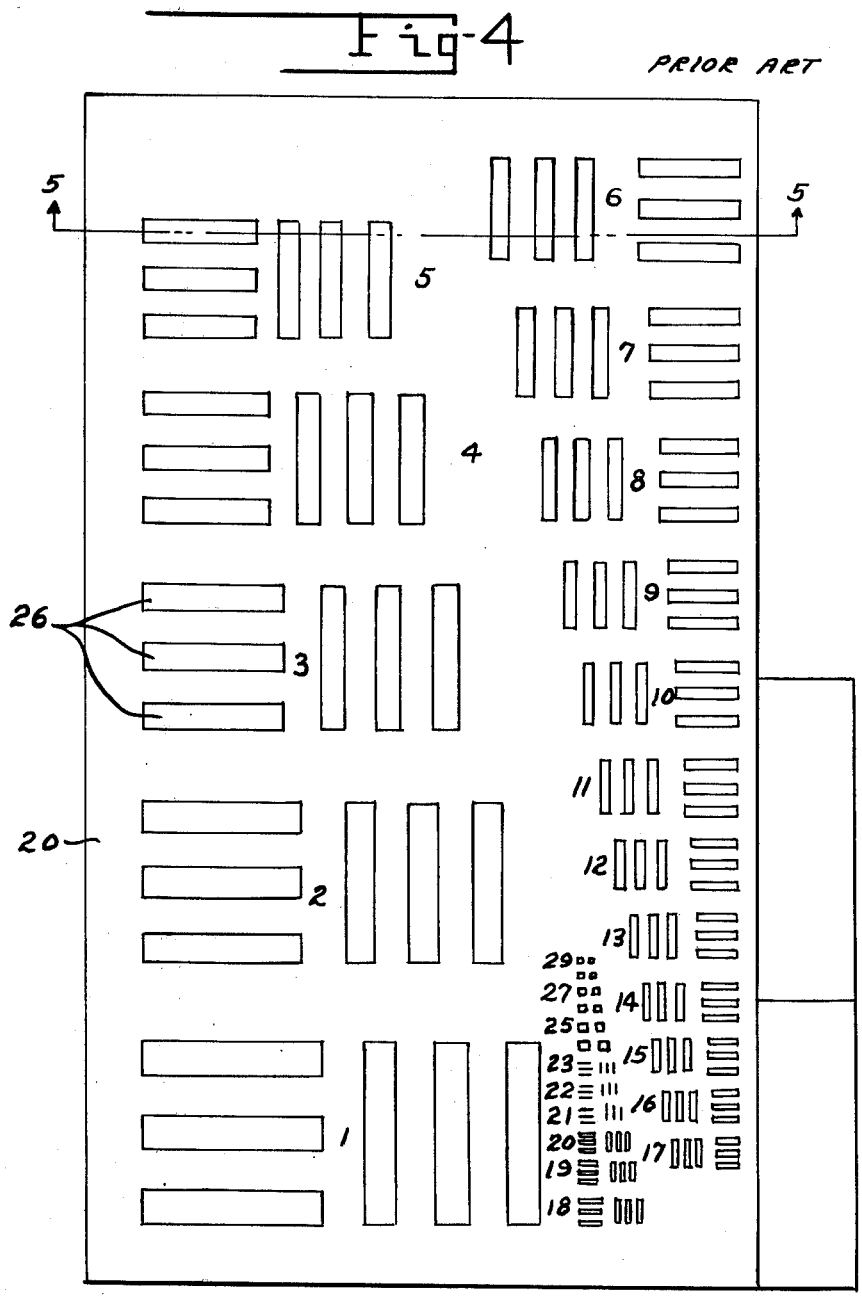
FIG. 4 shows a prior art photographic resolution array.
Figure 5:
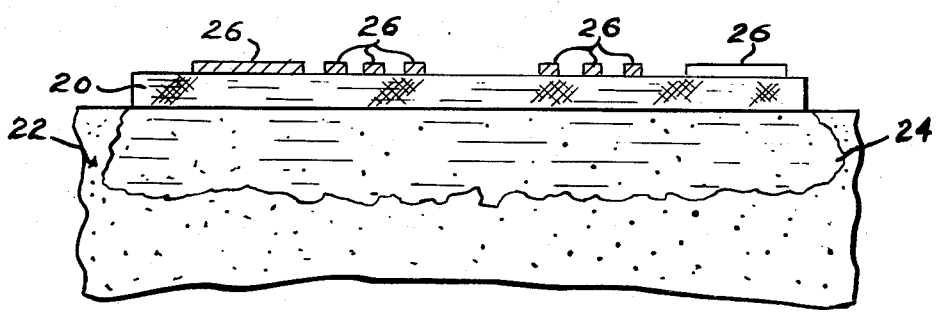
FIG. 5 is a sectional view of the device of FIG. 4 which is modified according to this invention.

According to this invention, an array, such as shown in FIG. 4, which is normally used for photographic resolution measurements is modified, as shown in FIGS. 5 and 6, so that it may be used for day time and night time testing of infrared reconnaissance sets.

The background pad is made by laying a fiberglass mat 20 on the ground indicated at 22 in FIG. 5. The length and width of the mat would be determined by the particular pattern used. The thickness of the mat would be between 1/16 inch and 3/16 inch depending upon the material and weave used in making the material. The fiberglass mat used was about $\frac{1}{8}$ inch thick with a 10 by 10 thread count, and a weight of 1.6 ounce per square yard. A polyvinyl acetate water emulsion is sprayed over the mat. In the construction of the device, the emulsion used is made by adding water, with a ratio of between 2-1 and 4-1 parts water, to polyvinyl acetate water emulsion with 55% solids by weight. Normally, between $\frac{1}{4}$ gal per sq yard and $1\frac{1}{4}$ gal per sq yard of the emulsion is used on the mat depending upon soil conditions. Some of the emulsion soaks into the ground to a level as indicated schematically at 24, in FIG. 5. Perforated aluminum panels 26 are then laid on the pad in a pattern such as shown in FIG. 4. The aluminum panels used were made of 14 gage aluminum sheet with holes 28 having diameters of 5/32 inch spaced on 3/16 inch centers. This provided approximately 63% open area. There can be between 50 to 80 percent open area. For best results, the open area should be between 60 and 70 percent. When solid aluminum sheets are used, they tend to saturate the infrared sensors.

In the operation of the device of the invention when the sun shines on the pad, it heats the pad to a temperature above the temperature of the surrounding area, known as the scene temperature. At night the pad retains the heat so that the pad temperature will remain above the scene temperature. The perforated aluminum sheets will be colder than the scene temperature, but not cold enough to saturate the sensor.

In night tests, with this array, the perforated aluminum bars consistantly measured at 5° to 15° colder than the scene average temperature and the pad consistantly measured at 2° to 5° warmer than the scene average temperature. These target arrays were found to produce a target signature that always falls in the linear operating region of the infrared reconnaissance equipment. The array was also found to permit accurate resolution measurements with low variance.

While the resolution testing system of the invention has been described with respect to a particular pattern, other patterns could also be used. Also, the heat retaining pad could be made of other materials than described above; for example, the pad could be made of clay.

There is thus provided an infrared spatial resolution target which uses passive elements for night testing of infrared reconnaissance sets, which is more versatile and less expensive than heated arrays, which requires very little maintenance and which has a target signature that falls in the linear operating region of infrared reconnaissance equipment.

I claim:

1. A passive resolution target array for testing of infrared reconnaissance sets in an area having a substantially normal scene average temperature, comprising: a background pad of heat retaining material; said background pad including means, responsive to solar radiation for providing a pad temperature greater than the scene average temperature; a plurality of perforated aluminum sheets with between 50 and 80 percent open area positioned on said pad in a conventional resolution measurement target configuration.

2. The device as recited in claim 1 wherein said perforated aluminum sheets have between 60 and 70 percent open area.

3. The device as recited in claim 2 wherein said background pad includes a fiberglass mat; said mat being saturated with a polyvinyl acetate water emulsion.

* * * * *